May 27, 1941. E. F. MARTINET ET AL 2,243,353
DUST BAG FOR SUCTION CLEANERS
Filed Sept. 9, 1938
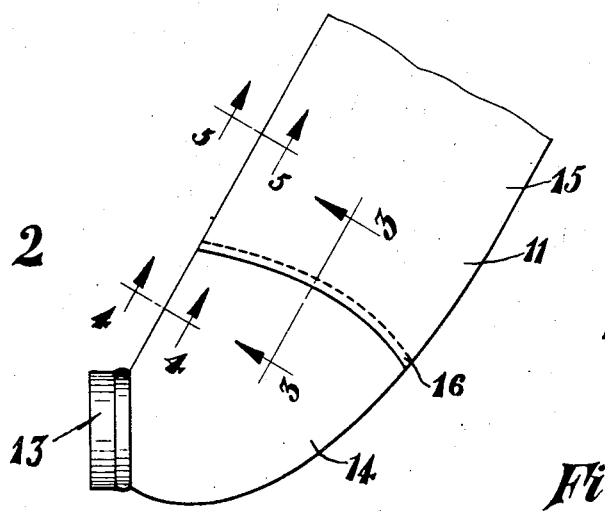
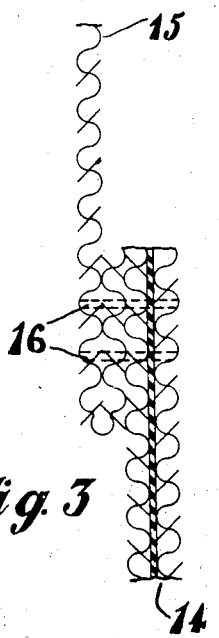
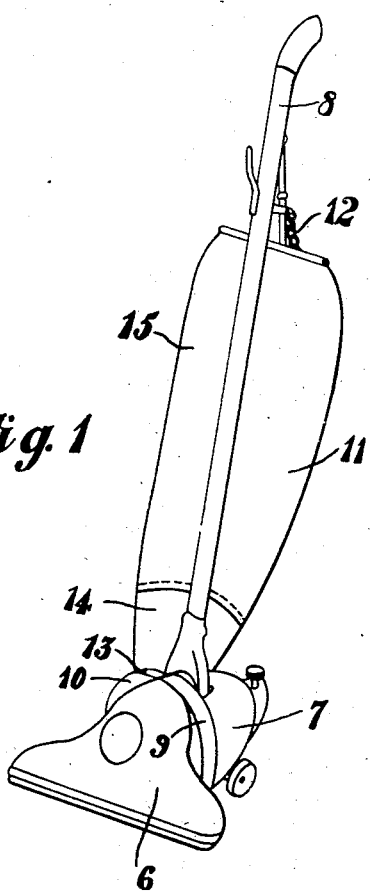
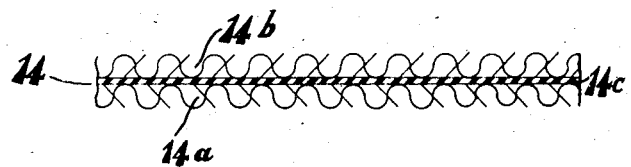
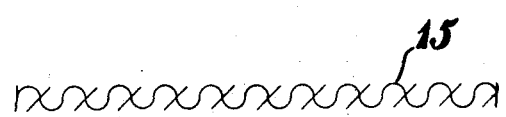
Inventor
Eugene F. Martinet
and Harold Van Schoor Patented May 27, 1941

2,243,353

UNITED STATES PATENT OFFICE 2,243,353

DUST BAG FOR SUCTION CLEANERS

Eugene F. Martinet, Cleveland, and Harold Van Schoor, Shaker Heights, Ohio, assignors to The P. A. Geier Company, Cleveland, Ohio, a corporation of Ohio Application September 9, 1938, Serial No. 229,150

3 Claims. (Cl. 183—51)

The invention relates to dust bags for suction cleaners and more particularly to the construction of a suction cleaner dust bag in the zone at and adjacent to the inlet opening thereof.

Suction cleaner dust bags are usually constructed of fabric or cloth or other filtering material which permits the passage of air therethrough and obstructs the passage of dust and other foreign matter so that the same is collected within the bag. Such bags are provided with an inlet opening usually by attaching a ring of metal or other rigid material to the fabric walls, which ring is detachably connected to the outlet member that defines the discharge or blower passage leading from the suction cleaner fan chamber.

The fabric walls of a suction cleaner dust bag are most severely taxed in the region at and adjacent to the inlet opening therefor, for two reasons. First, the dust and dirt laden air is discharged from the fan through the restricted outlet member at extremely high velocity into the dust bag through the inlet opening thereof. Before the velocity is slowed up sufficiently at this region, the finer particles of dust may be driven through the pervious or filtering fabric walls due to the high velocity pressure of the air; while in other regions, the filtering dust bag walls satisfactorily separate the dust from the air which is moving at much lower velocity.

Second, the foreign matter entrained by the air discharged from a suction cleaner includes not only dust, but may include dirt, sand, debris or other foreign materials having abrasive characteristics. When such materials are discharged at high velocities against the filtering walls of a dust bag in a region adjacent to the inlet openings of the dust bag, they may cut, abrade or weaken the filtering walls at this region. This action materially changes the filtering characteristics of the dust bag wall at this region, resulting in an increased amount of dust being driven through the filtering walls by the high velocity air.

It is therefore an object of the present invention to provide an improved fabric dust bag construction for suction cleaners, which resists the passage of air and entrained dust through the bag walls in the region at and adjacent to the bag inlet opening into which air and entrained matter is discharged at high velocity by the cleaner fan.

Likewise, it is a further object of the present invention to strengthen the fabric walls of a suction cleaner dust bag at and adjacent to the inlet opening thereof so as to resist the abrading and cutting action of foreign matter having abrasive characteristics discharged against the dust bag walls at such region.

Attempts have been made to solve these problems by sewing an inner lining within the dust bag at the region at and adjacent to the inlet opening thereof, but such an arrangement is expensive to manufacture due to the irregular shape of the bag at and adjacent to the restricted inlet opening and at the most only delays for a relatively short period of time the occurrence of the difficulties referred to. Moreover, dirt accumulates between the outer wall and inner lining, finally bunching up and materially restricting the effective area of the inlet opening.

We have discovered that the ordinary filtering fabrics such as twill fabric and the like, used in constructing suction cleaner dust bags, may be strengthened and made impervious and abrasion-resisting by cementing with a rubber cement or thermoplastic material which may be termed collectively as thermo-bonded material. This strengthening preferably may be accomplished by superimposing two strips of fabric one upon the other, with a layer of rubber cement or thermoplastic material therebetween and by then subjecting the same to heat or pressure or both, or to a similar rubber cementing or thermoplastic material bonding operation to produce a reinforced laminated air impervious and abrasion-resisting fabric.

Such laminated fabric may then be readily cut to the form of the dust bag walls in the region at and adjacent to the inlet opening thereof, to which laminated fabric the usual fabric walls may be joined for forming the remainder of the dust bag.

Accordingly, it is an object of the present invention to provide a suction cleaner dust bag having an air impervious fabric wall at and adjacent to the inlet opening thereof.

Moreover, it is an object of the present invention to provide a reinforced air impervious fabric wall at and adjacent to the inlet opening of a suction cleaner dust bag.

Likewise, it is an object of the present invention to provide a laminated air impervious fabric wall in the region at and adjacent to the inlet opening of a suction cleaner dust bag.

And finally, it is an object of the present invention to generally improve the construction and operation of a suction cleaner dust bag by eliminating the prior art difficulties and achieving one or all of the aforesaid desiderata in a convenient and inexpensive manner.

These and other objects may be obtained by the dust bag constructions, arrangements, combinations, sub-combinations, improvements, parts and apparatus which comprise the present invention, the nature of which is set forth in the following general statement, a preferred embodiment of which, together with its mode of construction and operation, is set forth in the following description, and which is particularly and distinctly pointed out and set forth in the appended claims forming part hereof.

The nature of the improvements of the present invention may be described in general terms as including in a suction cleaner dust bag, fabric dust filtering walls forming the dust bag and provided with an inlet opening for attachment to the outlet member of a suction cleaner, said fabric walls including an air impervious rubber cement or thermoplastic material impregnated reinforced preferably laminated fabric wall in the region at, adjacent to and surrounding the inlet opening thereof.

By way of example, an embodiment of the present improvements is illustrated in the accompanying drawing forming part hereof, in which Figure 1 is a perspective view of a suction cleaner equipped with the improved dust bag construction;

Fig. 2 is an enlarged fragmentary elevation of the dust bag shown in Fig. 1, illustrating the improved construction;

Fig. 3 is a fragmentary section taken on the line 3—3, Fig. 2;

Fig. 4 is a fragmentary section taken on the line 4—4, Fig. 2; and

Fig. 5 is a fragmentary section taken on the line 5—5, Fig. 2.

Similar numerals refer to similar parts throughout the various figures of the drawing.

In Fig. 1, a usual type of suction cleaner is shown including a nozzle 6, a motor housing 7, an operating handle 8, and a fan housing 9 having an outlet member 10 to which a dust bag generally indicated at 11 is detachably connected. The dust bag 11 may be supported by any usual means as at 12 from the handle 8.

Referring more particularly to Fig. 2, the dust bag 11 may include a metal ring 13 which may be detachably connected in any usual manner to the cleaner outlet member 10, from which ring 13 the fabric walls of the dust bag extend. As shown, these fabric walls include a flexible portion 14 in the region at, adjacent to, and surrounding the opening formed by the connection of the material 14 to the ring 13; and another portion 15 which may be preferably sewn or stitched as at 16 to the portion 14. The bag wall portion 15 extends upwardly to the top of the bag where the same is supported by the means 12 from the cleaner handle 8.

The flexible dust bag wall portion 14 is, in accordance with the present invention, composed of an air impervious, rubber cement or thermoplastic material impregnated, reinforced, and preferably laminated, fabric in a manner presently to be described; while the portion 15 may be formed of any of the usual filtering fabrics from which suction cleaner bags are made, such as twill fabric and the like.

The air impervious material bag wall portion 14 is best illustrated in Figs. 3 and 4 and is preferably composed of an inner lamina 14a and an outer lamina 14b, which are permanently secured or joined together by impregnation of a bonding material indicated at 14c, which may be rubber cement or thermoplastic material. In making the material 14, the laminae 14a and 14b may be superimposed upon one another with a layer of the bonding material 14c therebetween and then subjected to heat or pressure or both, or to another similar thermo-bonding operation to permanently impregnate the laminae 14a and 14b with the bonding material and so join them together. The resulting flexible fabric material 14 is rendered air impervious by the bonding material and is likewise strengthened and rendered abrasion-resistant not only by the bonding material, but also by the plurality of layers of thermoplastically treated fabric forming the laminated structure.

Referring particularly to Figs. 3 and 5, as previously stated, the upper bag portion 15 may be formed of usual dust bag filtering fabric, which may be stitched as at 16 to the air impervious laminated fabric 14.

A suction cleaner dust bag constructed in accordance with the foregoing accordingly has an air impervious wall immediately adjacent to the inlet opening 13 thereof, through which air impervious wall the high velocity dust laden air discharged into the dust bag cannot pass. The air impervious fabric also satisfactorily resists the abrading or cutting action of foreign matter having abrasive characteristics which may be entrained in the dust laden air discharged at high velocity into the dust bag.

It is to be understood that the present invention is not limited specifically to providing two layers of fabric rendered air impervious by thermoplastic treatment and the like, as one or three or more layers of the same may be utilized, depending upon the conditions encountered. Moreover, the bottom or inlet end of a dust bag formed of the usual fabric could be thermoplastically treated to render the same air impervious without departing from the scope of the present invention.

Having now described the features of the invention, the construction, operation and use of a preferred form of the same, and the advantages and results obtained by the use of the same, the new and useful parts, elements, combinations, constructions and devices, and their reasonable mechanical equivalents thereof obvious to those skilled in the art, are set forth in the appended claims.

We claim:

1. In a suction cleaner dust bag, fabric walls provided with an inlet opening, said fabric walls including a laminated air impervious abrasion-resistant portion at and adjacent to said opening, and said laminated portion consisting of fabric thermo-bonded with rubber cement.

2. In a suction cleaner dust bag, fabric walls provided with an inlet opening, said fabric walls including an air impervious portion at and adjacent to said opening, and said air impervious portion consisting of a plurality of layers of thermo-bonded fabric and bonding material.

3. In a suction cleaner dust bag, fabric walls provided with an inlet opening, said fabric walls including an air impervious portion surrounding the bag end at and adjacent to said inlet opening and having a plurality of layers of fabric thermo-bonded together with plastic bonding material.

EUGENE F. MARTINET.
HAROLD VAN SCHOOR.